United States Patent [19]
Wolf

[11] 3,941,255
[45] Mar. 2, 1976

[54] ARTICLE TURNING DEVICE
[75] Inventor: Siegfried G. Wolf, Salem, Ohio
[73] Assignee: Gulf & Western Manufacturing Company, Southfield, Mich.
[22] Filed: Nov. 25, 1974
[21] Appl. No.: 526,745

[52] U.S. Cl. .......................... 214/1 QG; 214/130 R
[51] Int. Cl.² ........................................ B65G 47/24
[58] Field of Search ... 214/1 QG, 1 Q, 1 BD, 130 R

[56] References Cited
UNITED STATES PATENTS

| | | | |
|---|---|---|---|
| 2,999,605 | 9/1961 | Jarnett | 214/2.5 |
| 3,302,768 | 2/1967 | Cooper | 214/1 Q X |
| 3,390,789 | 7/1968 | Hill | 214/1 Q |

Primary Examiner—Robert J. Spar
Assistant Examiner—George F. Abraham
Attorney, Agent, or Firm—Meyer, Tilberry & Body

[57] ABSTRACT

A device is disclosed for turning a metal billet from a horizontal to a vertical position. The device includes a table having inlet and discharge ends and supported for pivotal movement about a horizontal axis transverse to the direction between the ends. The table is provided with rollers supporting the billet for movement relative thereto, and a pivotal stop member is disposed at the discharge end of the table. A billet is received on the table in a horizontal disposition, and the table is pivoted about the horizontal axis to turn the billet to a vertical disposition. The stop arm pivots with the table and a linkage arrangement is provided by which the stop member is simultaneously pivoted relative to the table to release the billet when the table approaches the vertical disposition.

19 Claims, 9 Drawing Figures

ARTICLE TURNING DEVICE

This invention relates to article handling devices and, more particularly, to a device for turning an article from a horizontal to a vertical disposition.

The present invention finds particular utility in connection with the turning of a metal billet from a horizontal disposition to a vertical disposition for feeding into a power press mechanism in which work is performed on the billet. Accordingly, the invention will be described in detail hereinafter in connection with the turning of such a billet, but it will be appreciated that the invention is applicable to the turning of articles other than billets.

Metal billets which define workpieces for multiple stage presses or the like are quite large and heavy, whereby problems are encountered in connection with conveying and feeding such billets to the press. Such billets may, for example, be generally square in cross section and of a length greater than the cross-sectional dimensions thereof. Accordingly, the billet is generally conveyed toward the press feeding station with the length dimension thereof in a horizontal disposition and parallel to the path of conveyor movement, and the conveyor path is often located above the workpiece entrance into the press. In certain press and billet conveyor arrangements of the foregoing character, devices including chutes, skid plates, deflector funnels and the like have been employed to feed the billet from the conveyor to the press entrance. In moving the billet from the conveyor to the press in this manner the billet is often turned to a generally vertical disposition and allowed to drop a considerable distance from the conveyor into engagement with a chute, skid plate or the like. If the billet, for example, weighs fifty pounds it will be appreciated that such free fall of the billet results in a considerable impact load on the device onto which it falls. Moreover, such impact is accompanied by considerable noise, and the force of impact necessitates the use of components structurally capable of absorbing repeated impact forces. Thus, the billet feeding mechanism becomes structurally complex and expensive to produce and maintain and is subjected to wear and damage which reduces the useful life thereof.

In accordance with the present invention, a billet turning device is provided which avoids the foregoing problems, and others, heretofore encountered in connection with press billet feeding mechanisms. More particularly, the turning device of the present invention supports the billet during turning thereof from a generally horizontal to a generally vertical disposition and releases the billet for movement toward an associated press feed component as the billet approaches the vertical disposition. Therefore, free fall of the billet is precluded until the billet is in a substantial vertical disposition, and this reduces the momentum of the billet which would otherwise be attained as soon as the billet is turned sufficiently to slide relative to the device by which it is initially supported in the horizontal disposition.

In accordance with a preferred embodiment of the present invention, the turning device also operates to lower the leading end of the billet relative to the plane of the initial horizontal support therefor. Accordingly, when the billet is turned to the vertical disposition and then released, the leading end of the billet is closer to the underlying press feed device than is the horizontal plane, whereby free fall distance is minimized. The reduced free fall distance advantageously minimizes the impact load on the underlying feed device, wear or damage thereto as a result of repeated impact forces thereon, and minimizes the noise attendant to impact. Furthermore, the lower impact loads enable the use of structurally smaller parts in components of the underlying press feed mechanism, thus leading to savings in the costs of production and maintenance.

Further in accordance with the present invention, the billet or article to be turned is supported by a table or the like which is adapted to be pivoted between generally horizontal and vertical positions. When the table is in the vertical disposition, the billet is discharged from the lower end thereof for free fall into an underlying billet receiver. During pivotal movement of the table between the horizontal and vertical positions, a stop member at the discharge end of the table engages the billet and supports the latter against discharge from the table until the table reaches the substantially vertical position thereof. The stop member further operates during pivotal movement of the table to allow the leading end of the billet to move outwardly of the discharge end of the table. Thus, when the table approaches the vertical position the leading end of the billet has gradually moved to a position beyond the discharge end of the table and thus closer to the underlying billet receiver. Such movement of the billet of course reduces the free fall distance when the billet is released from the table. Still further, by supporting the table for pivotal movement about an axis spaced from the discharge end toward the entrance end and disposed adjacent the bottom of the table, movement of the table to the vertical position lowers the discharge end to a position below the horizontal plane on which the billet is initially supported. This also reduces the free fall distance and, together with the billet movement provided for by the stop member, minimizes the free fall distance.

It is accordingly an outstanding object of the present invention to provide an improved device for turning an article from a generally horizontal to a generally vertical disposition.

Another object is the provision of a turning device of the foregoing character by which the article is released for free fall when the article closely approaches the vertical disposition.

A further object is the provision of an article turning device which provides for reducing impact loads of an article of given size on an underlying component onto which the article falls upon release.

Yet another object is the provision of an article turning device of the foregoing character which provides for reducing the free fall distance of the article by moving the leading end of the article, prior to release, to a position closer to the underlying component than the plane of initial horizontal support for the article.

Still another object is the provision of an article turning device of the foregoing character in which the free fall distance of the article is reduced by displacing the article relative to a support therefor during the turning movement so that the leading end of the article is closer to the underlying component, upon release, than it would be without such displacement.

Yet a further object is the provision of an article turning device of the foregoing character adapted to receive a metal billet in a horizontal disposition and to turn the billet to a substantially vertical disposition and then release the billet for free fall onto an underlying press feed component and in a manner whereby the free fall distance, upon release, is minimized.

Yet another object is the provision of an article turning device of the foregoing character which is structurally simple, comprised of a minimum number of parts, efficient in operation and economical to produce and maintain.

The foregoing objects, and others, will in part be obvious and in part pointed out more fully hereinafter in connection with the description of a preferred embodiment illustrated in the accompanying drawings in which:

Figure 1:
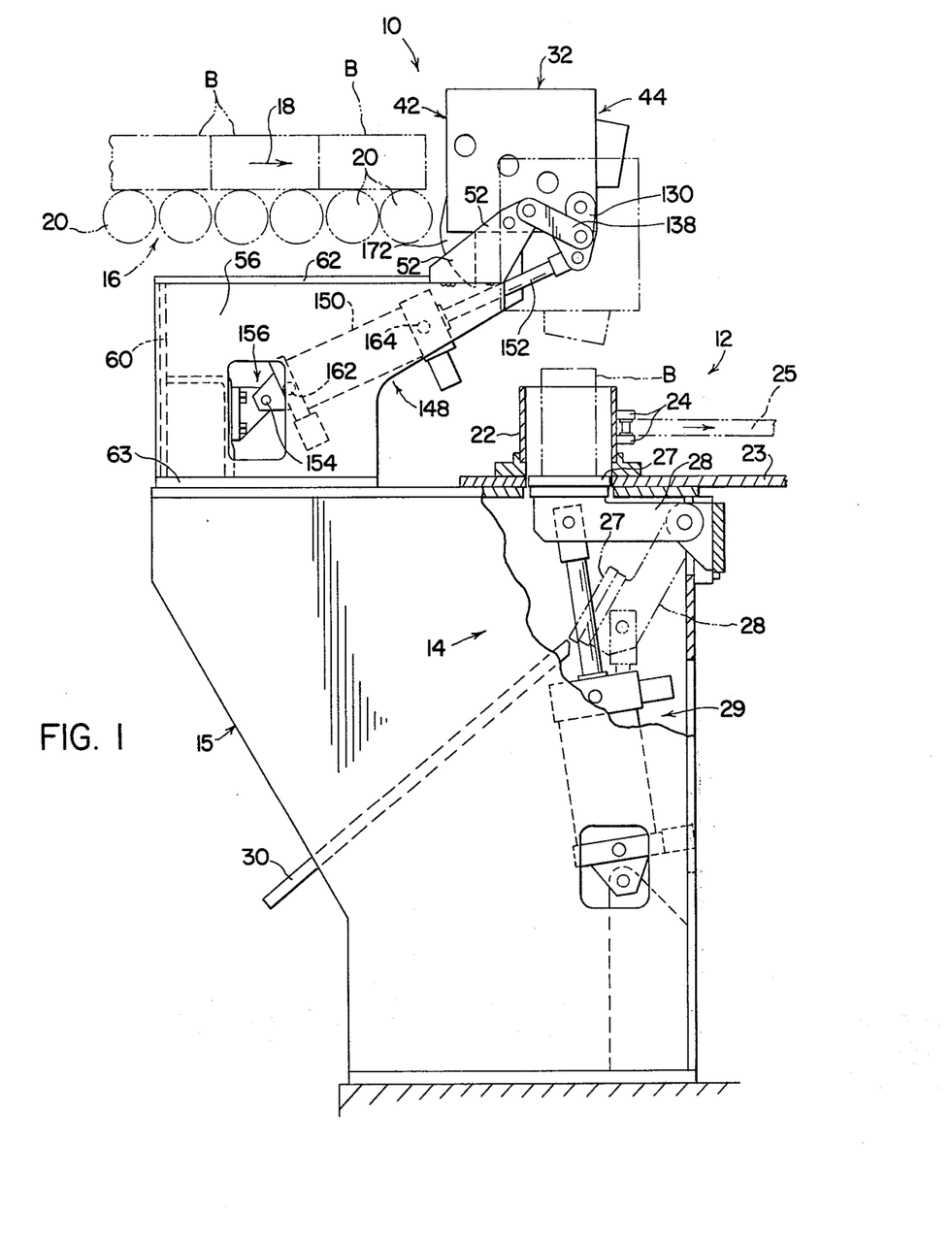
FIG. 1 is a side elevation view of a billet turning device made in accordance with the present invention.

Referring now in greater detail to the drawings wherein the showings are for the purpose of illustrating a preferred embodiment of the invention only and not for the purpose of limiting the invention, FIG. 1 illustrates a billet turning device 10 made in accordance with the present invention. The turning device is shown in association with a billet conveyor 12 by which the billet is fed to a press, not shown, and a reject mechanism 14 by which a billet can be removed from the feed line. Turning device 10, conveyor 12 and reject mechanism 14 are supported by a suitable frame structure 15 which in turn is suitably mounted on an underlying support such as a press bed. A billet conveyor, illustrated schematically and designated by numeral 16, is operable to convey billets B from a billet supply source and toward the turning device in the direction of arrows 18. Any suitable conveyor arrangement can be employed and, in the embodiment shown, conveyor 16 includes a plurality of rollers 20. The rollers are driven in a well known manner and the drive thereof is controlled to achieve the desired movement of billets B toward turning device 10.

As described more fully hereinafter, a billet B is received in turning device 10 in the position thereof illustrated by solid lines in FIG. 1. Thereafter, the turning device is pivoted to the position illustrated by broken lines in FIG. 1, and the billet is released to drop by free fall into a billet bucket 22 of conveyor 12. Bucket 22 is slidable on a conveyor track plate 23 and is provided with arms 24 connected to a sprocket chain 25 which is suitably driven to move the bucket and a billet therein along track 23 to the press. Track plate 23 is provided with an opening 26 at the point of billet feed into the bucket from turning device 10, and reject mechanism 14 includes a door 27 adapted to close opening 26. Door 27 is mounted on a pivotal lever 28 which is actuatable by a piston and cylinder mechanism 29 to pivot the door between the solid line and broken line positions thereof shown in FIG. 1. If a billet deposited in bucket 22 is to be rejected, lever 28 is actuated to pivot door 27 to the broken line position thereof, whereby the billet exits through opening 26 and onto an inclined ramp 30 leading to a suitable reject billet receiver.

The preferred structure of turning device 10 is shown in detail in FIGS. 2–5 of the drawing. With regard to the latter Figures together with FIG. 1, it will be seen that the turning device includes a tubular metal housing or shell 32 having a top wall 34, a bottom wall 36, and side walls 38 and 40. The housing has an entrance end 42 and a discharge end 44. A plurality of roller elements 46 are provided within housing 32 on corresponding shafts 48, the opposite ends of which shafts extend through corresponding openings in sidewalls 38 and 40. The ends of shafts 48 are suitably secured to sidewalls 38 and 40 against rotation relative thereto, and rollers 46 are adapted to rotate relative to the corresponding shaft 48. Spacers 50 serve to maintain rollers 46 in desired positions longitudinally of the corresponding shaft 48. Further, rollers 46 on adjacent shafts 48 are laterally offset with respect to each other to provide for the rollers to be more closely spaced in the direction between the inlet and discharge ends of housing 32. A plane tangent to the uppermost edges of rollers 46 defines a planar support surface for billets B.

As described hereinabove, the turning device is pivotal between horizontal and vertical positions and, in this respect, housing 32 is pivotally interconnected with a pair of support arms 52 and 54 adjacent housing sidewalls 38 and 40, respectively. Support arms 52 and 54 are laterally spaced apart and extend upwardly from a support assembly comprised of laterally spaced apart side plates 56 and 58, end plate 60 extending between plates 56 and 58, and a horizontal top plate 62, all of which plates are suitably interconnected, such as by welding. The bottom edges of side plates 56 and 58 and end plate 60 are suitably interconnected such as by welding with a base plate 63 which is bolted or otherwise secured to frame assembly 15. Support arms 52 and 54 are welded or otherwise secured to the corresponding side plates 56 and 58 forwardly of top plate 62 and are laterally spaced apart to receive housing 32 therebetween.

Housing 32 is pivotally mounted on support arms 52 and 54 by means of a pair of bearing blocks 64 and 66 on the housing and corresponding pivot pins 68 and 70 between the blocks and support arms. More particularly, a portion of housing walls 36 and 38 between the opposite ends of the housing and adjacent the juncture of the walls is cut-away to define an opening 72 for bearing block 64 and, similarly, a portion of housing walls 36 and 40 is removed to define an opening 74 for bearing block 66. Bearing blocks 64 and 66 are welded or otherwise secured to the corresponding housing walls and are provided with pin openings receiving the inner ends of the corresponding pivot pins. Bearing sleeves 76 and 78 are interposed between the bearing blocks and pivot pins, and washers 80 and 82 are interposed between the bearing blocks and support arms 52 and 54.

Pins 68 and 70 extend through openings therefor in the corresponding support arm, and the outer ends of the pins are provided with radially extending plates 84 and 86 which are integral with or attached, such as by welding, to the corresponding pin. Plates 84 and 86 extend radially beyond the outer periphery of the corresponding pivot pin and are releaseably fastened to the corresponding support arms such as by threaded fasteners 88 and 90. It will be seen, therefore, that housing 32 is pivotal relative to pins 68 and 70 and is adapted to be removed from support arms 52 and 54 by removing fasteners 88 and 90 and then withdrawing the pivot pins from the bearing blocks and support arms. Pivot pins 68 and 70 provide for the housing to be pivotal about a horizontal axis transverse to the direction between ends 42 and 44 of the housing and, preferably, the pivot axis is disposed slightly beyond the center point between the opposite ends of the housing in the direction from discharge end 44 toward input end 42. Moreover, the pivot axis is disposed beneath the support surface defined by rollers 46.

A billet guide assembly 92 is provided within housing 32 and, in the embodiment shown, includes an inverted U-shaped channel member comprised of a web defining a top wall 94 and laterally spaced apart flanges defining sidewalls 96 and 98 parallel to housing walls 38 and 40, respectively. The guide assembly is mounted on housing 32 by means of a pair of longitudinally extending ribs 100 welded to top wall 94 and releaseably interconnected with top wall 34 of the housing by means of a plurality of threaded bolts 102.

Figure 2:
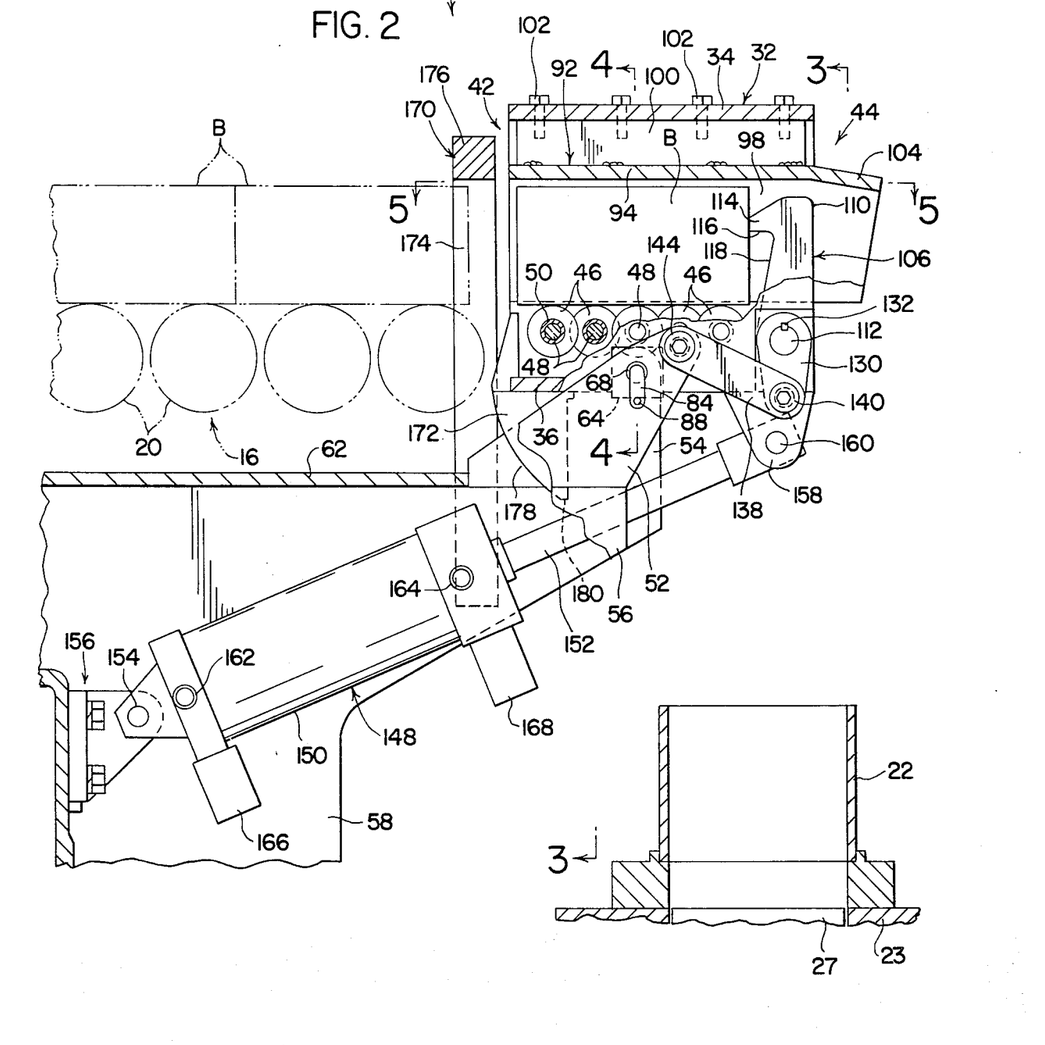
FIG. 2 is an enlarged side elevation view of the article turning device shown in FIG. 1.
Figure 3:
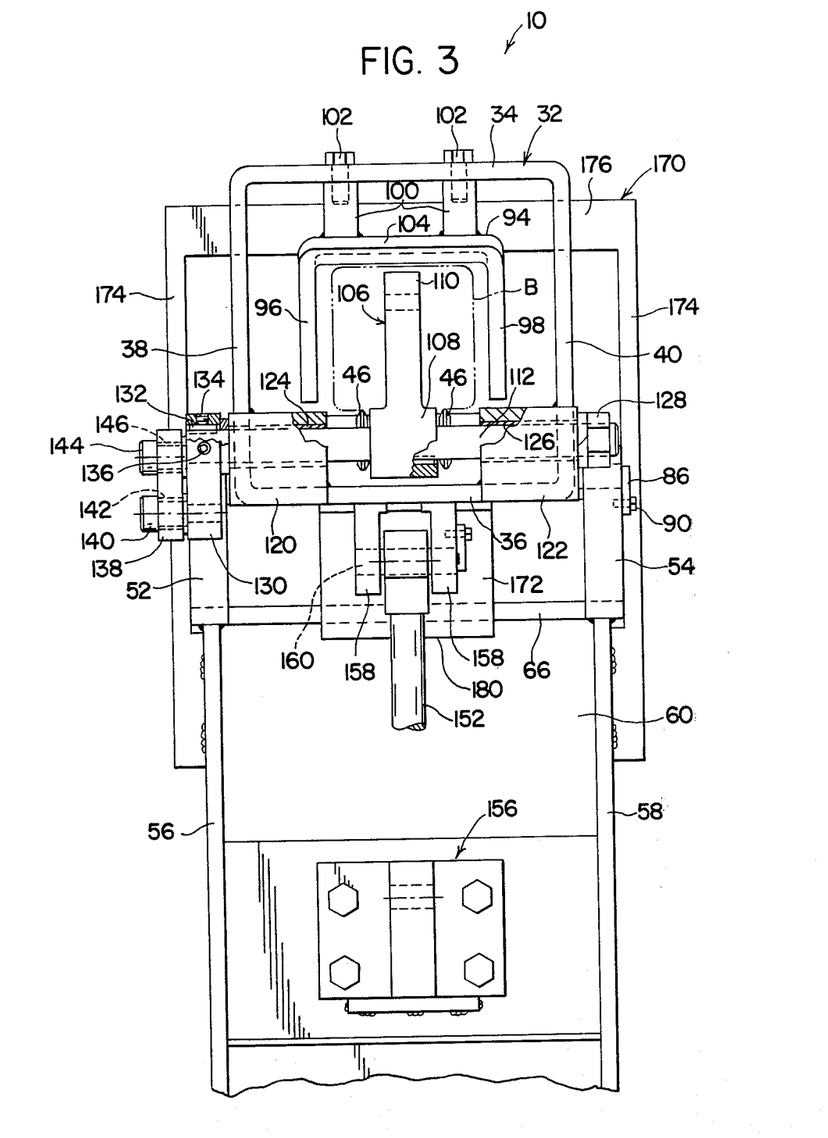
FIG. 3 is an end elevation view of the article turning device, the view being along line 3—3 in FIG. 2.
Figure 4:
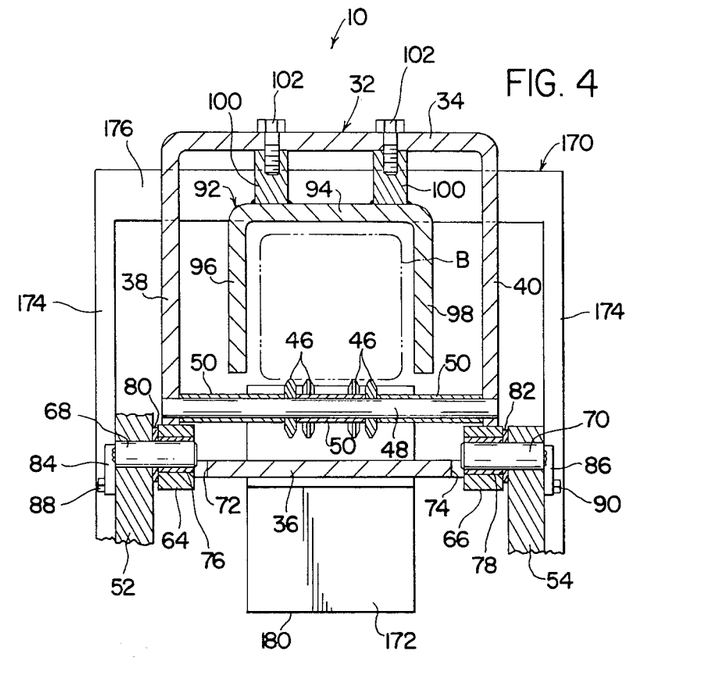
FIG. 4 is a sectional elevation view of the device taken along line 4—4 in FIG. 2.
Figure 5:
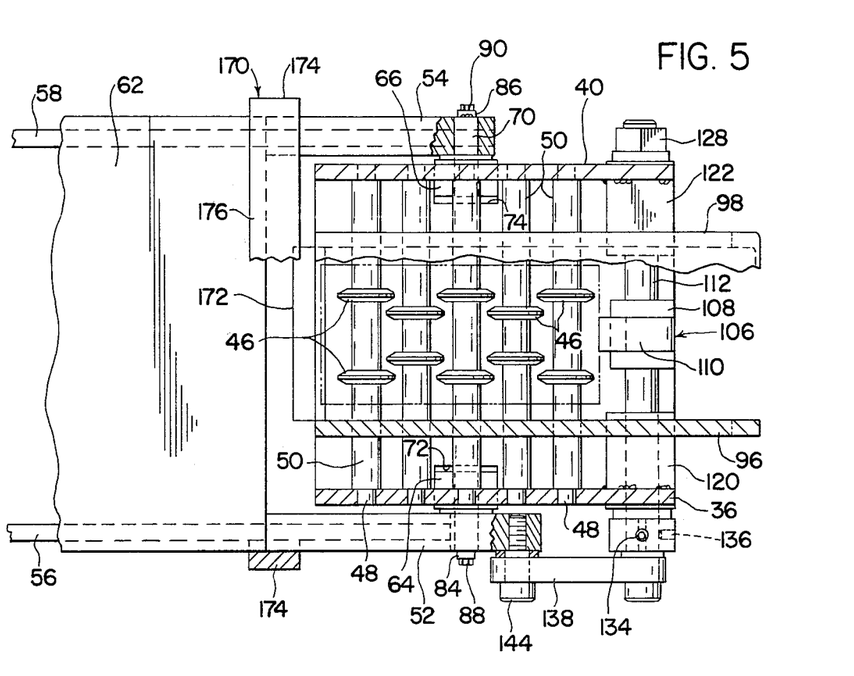
FIG. 5 is a plan view, in section, taken along line 5—5 in FIG. 2.

The bottom edges of sidewalls 96 and 98 of the guide assembly are generally coplanar with the uppermost edges of rollers 46, and the sidewalls are laterally spaced apart to receive billet B therebetween. Further, the top wall and sidewalls of the guide assembly are generally coplanar with the ends of the walls of housing 32 at the inlet end 42 thereof. The opposite ends of top wall 94 and sidewalls 96 and 98 extend outwardly beyond outlet end 44 of housing 32 as seen in FIG. 2. Moreover, the portion of top wall 94 extending beyond outlet end 44 defines a deflector plate 104 which is inclined downwardly relative to the plane of top wall 94 for the purpose set forth hereinafter.

A stop member 106 is pivotally mounted on housing 32 at and laterally centrally of discharge end 44 thereof. Stop member 106 is in the form of a lever pivotal about an axis parallel to the axes of pins 68 and 70 and has opposite ends 108 and 110. End 108 is apertured to receive a pivotal shaft 112 and is keyed or otherwise secured to the shaft for pivotal movement therewith. End 110 of stop member 106, in the position shown in FIG. 2, is slightly spaced from top wall 94 of guide assembly 92 and is provided with a projection or nose 114 extending in the direction toward inlet end 42 of the housing. Nose 114 provides the inwardly facing edge of stop member 106 with a notch-like configuration defined by edges 116 and 118 which provide a billet shoulder for the purpose set forth hereinafter.

Shaft 112 is supported for pivotal movement with housing 32 and for pivotal movement relative thereto. More particularly, the edges of housing walls 36 and 38 adjacent discharge end 44 are notched to receive a bearing block 120 and, similarly, housing walls 36 and 40 are notched to receive a bearing block 122. Bearing blocks 120 and 122 are provided with aligned openings therethrough to receive shaft 112, and suitable bearing sleeves 124 and 126 are provided between the bearing blocks and the corresponding portions of shaft 112. The end of shaft 112 extending through bearing block 122 is threaded to receive a nut 128 which is pinned or otherwise secured to the shaft against unintentional displacement therefrom. The opposite end of shaft 112 extends through and beyond bearing block 120.

A link member 130 is removably mounted on the outer end of shaft 112 for pivotal movement therewith by means of a key 132 and set screws 134 and 136. In the position of the components illustrated in FIG. 2, link member 130 extends downwardly and the lower end thereof is pivotally interconnected with the corresponding end of a second link member 138 by means of a pin 140. Pin 140 extends through link 138 and into an opening for the pin in link 130. The inner end of pin 140 is suitably secured to link 130, and the opening in link 138 is provided with a bearing sleeve 142 for the corresponding end of pin 140. The opposite end of link 138 is pivotally interconnected with support arm 52 by means of a pin 144 which extends through link 138 and into an opening in the support arm. Pin 144 is suitably interconnected with support arm 52 and the opening in link 138 is provided with a bearing sleeve 146 for the corresponding end of pin 144.

The axes of shaft 112 and pins 140 and 144 are parallel to one another and to the axes of pins 68 and 70. Moreover, the axis of pin 144 is spaced above the axes of pins 68 and 70 and forwardly thereof in the direction toward discharge end 44 of the housing. The axis of shaft 112 is disposed adjacent the discharge end of the housing and is spaced beneath the planar supporting surface defined by the uppermost edges of rollers 46. The linkage arrangement described above, as set forth more fully hereinafter, provides for stop member 106 to pivot with housing 32 and relative thereto in a manner whereby the stop member pivots clockwise as seen in FIG. 2 during clockwise pivotal movement of the housing.

Housing 32 and thus stop member 106 are adapted to be pivoted clockwise as seen in FIG. 2 by means of a pneumatic piston and cylinder actuator mechanism 148. The latter mechanism includes a cylinder 150 which, in a well known manner, supports a piston for reciprocating movement in opposite directions therein. The piston drives a piston rod 152 which accordingly is reciprocable relative to the cylinder. One end of cylinder 150 is pivotally interconnected at 154 with a suitable support assembly 156, and the free end of piston rod 152 is disposed between a pair of plates 158 extending downwardly from and suitably connected such as by welding to bottom wall 36 of housing 32. A pin 160 pivotally interconnects the free end of piston rod 152 with plates 158. Cylinder 150 is provided with air ports 162 and 164 by which air from a suitable source, not shown, is delivered to and returned from the cylinder to achieve piston rod displacement. Limit switches 166 and 168 are provided at opposite ends of cylinder 150 to sequence other equipment in response to actuation of the turning mechanism. It will be appreciated that suitable controls, not illustrated, are provided to control air flow to cylinder 150. Advantageously, the pneumatic actuator mechanism operates as a shock absorber when a billet B is fed into housing 32 and engages stop member 106.

Turning mechanism 10 further includes a billet hold back and separator arrangement including an inverted U-shaped frame component 170 adjacent input end 42 of housing 32, and a plate member 172 mounted on the bottom of housing 32 adjacent input end 42. Frame member 170 includes a pair of legs 174 extending upwardly from frame plates 56 and 58, and a cross member 176 extending between and suitably interconnected with legs 174 at the upper ends thereof. Plate member 172 depends from bottom wall 36 of housing 32 and is suitably secured thereto such as by welding. The plate member includes a curved edge 178 having a generally uniform radius of curvature measured from the axes of pivot pins 68 and 70. Moreover, plate 172 has a nose 180 spaced from bottom wall 36 a distance sufficient to provide for the nose to be disposed in the path of movement of billets B on conveyor 16 toward entrance end 42 of the housing when the housing is pivoted clockwise 90° from the position illustrated in FIG. 2. As set forth hereinafter, curved surface 178 and nose 180 are operable to stop movement of a billet B toward input end 42 during such clockwise pivotal movement of the housing, thus to preposition a billet on conveyor 16 for introduction into the housing and to prevent such movement into the housing until the latter is returned to the position illustrated in FIG. 2. Plate 172 is, of course, of a width sufficient to engage and stop a billet B on conveyor 16 so that the billet will not be deflected laterally with respect to its path of movement toward housing 32.

Figure 6:
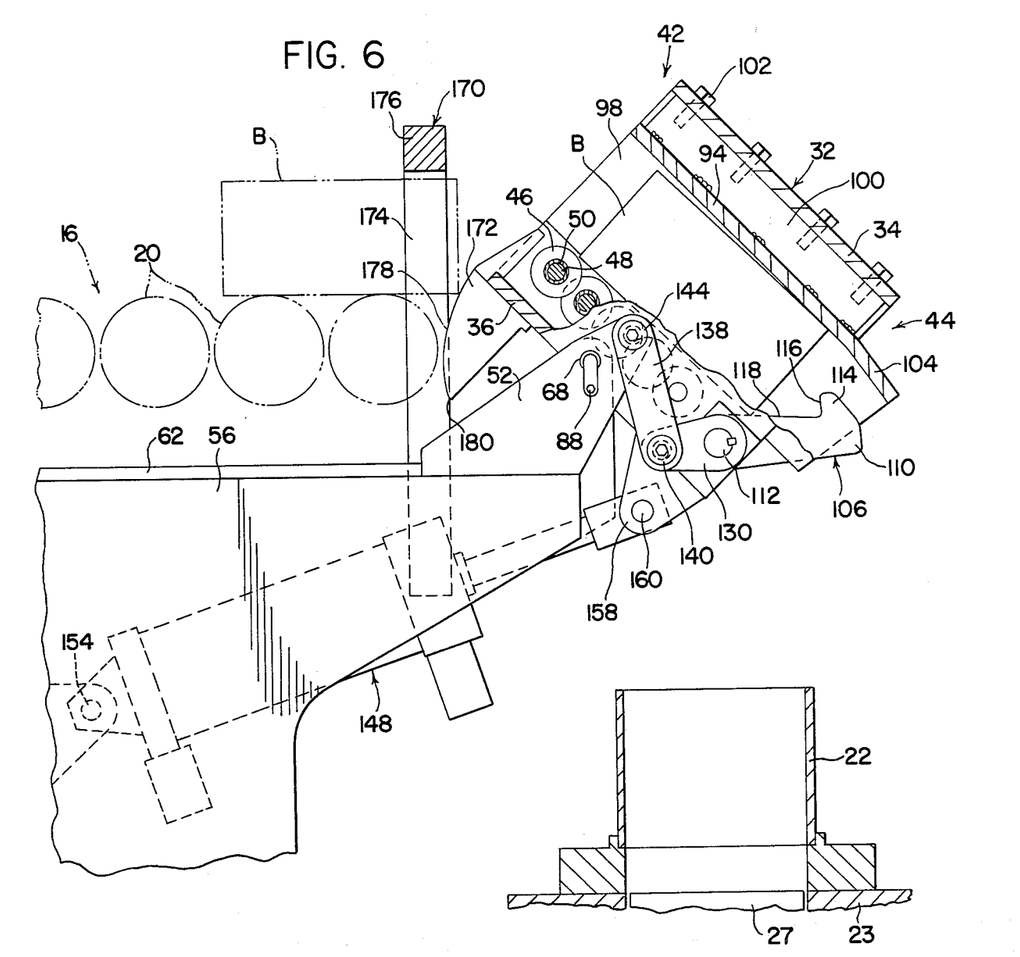
FIGS. 6–8 are side elevation views of the device similar to FIG. 2 and showing the billet supporting table in different positions between the horizontal and vertical dispositions thereof; and, FIG. 9 is a schematic illustration of the dimensional relationships between the components of the preferred embodiment of the turning device.
Figure 7:
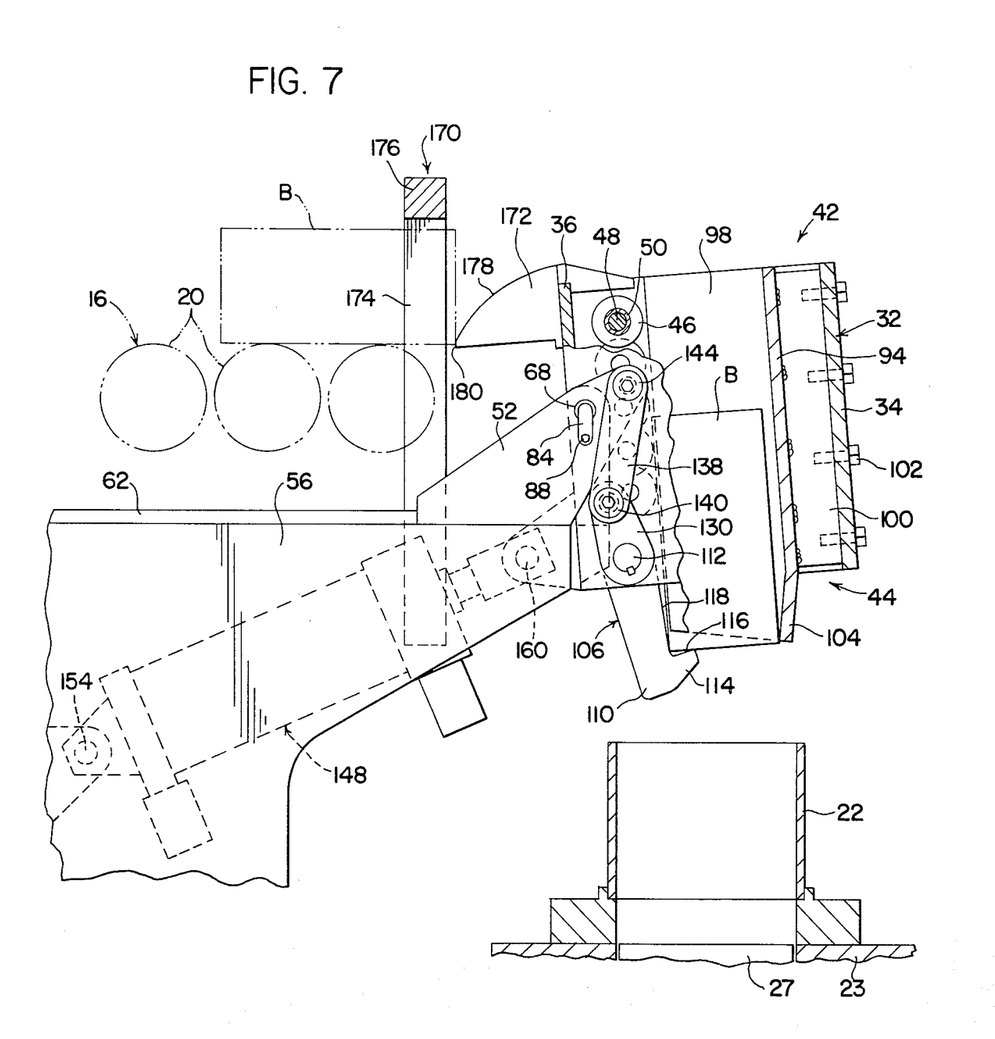
Figure 8:
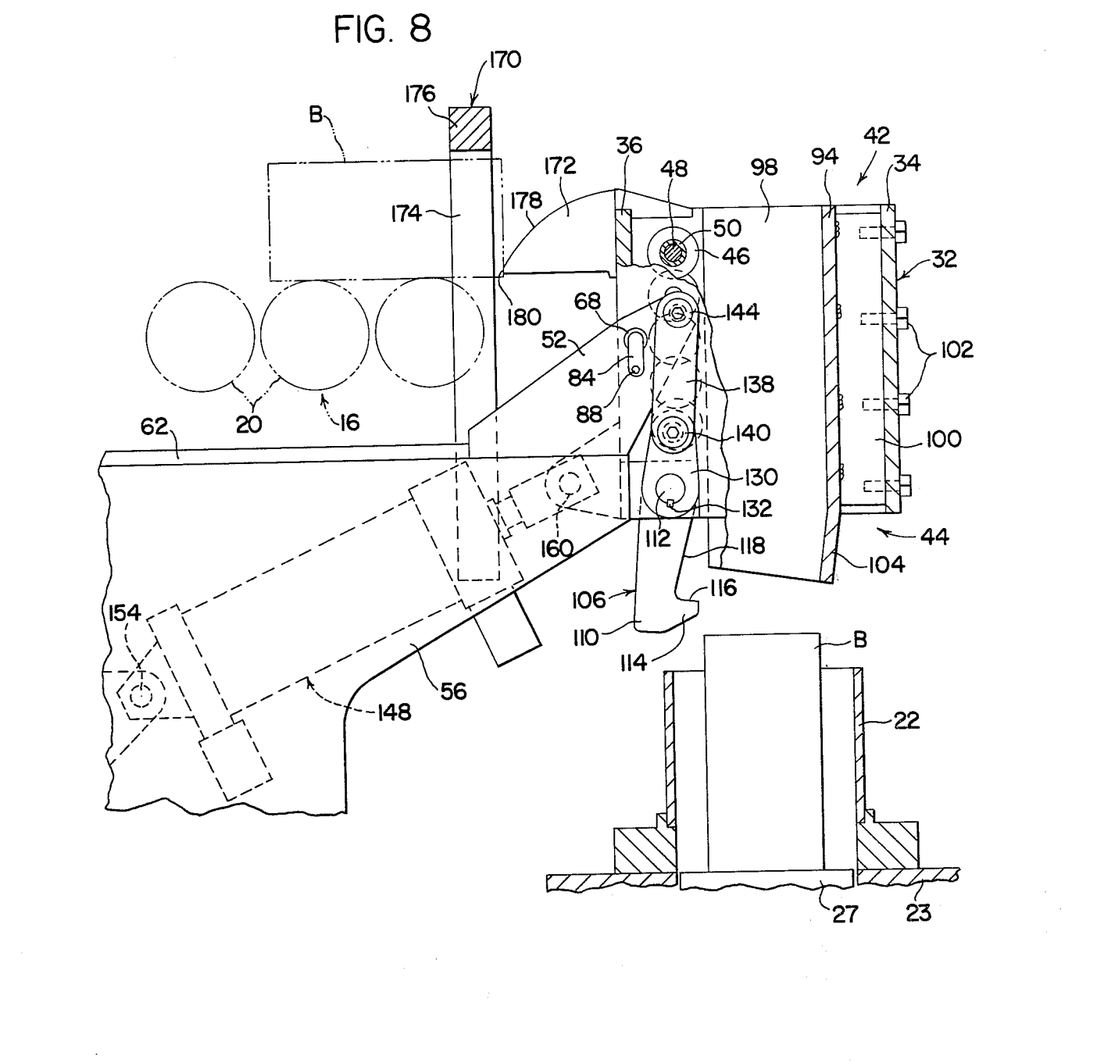

The operation of the turning device as described above will be best understood by referring to FIGS. 6–8 together with FIG. 2. In this respect, FIG. 2 shows the turning device in the position to receive a billet B. As the billet moves into the input end of the device and onto rollers 46, the leading end of the billet engages nose 114 of stop member 106 and is held in the latter position by the stop arm. Piston and cylinder assembly 148 is then actuated to displace piston rod 152 into cylinder 150, whereby housing 32 is pivoted clockwise about the axes of pivot pins 68 and 70. Such pivotal movement imparts clockwise pivotal movement to stop member 106 through link members 130 and 138. Accordingly, stop arm 106 pivots outwardly with respect to discharge end 44 of the housing and billet B also moves toward the discharge end in engagement with the support arm.

Pivotal movement of arm 106 is gradual and simultaneous with pivotal movement of housing 32, and when the housing has pivoted approximately 45° from the position illustrated in FIG. 2, the several components are in the positions thereof illustrated in FIG. 6 of the drawing. In this respect, it will be noted that stop arm 106 has pivoted to the extent that the leading end of billet B engages surface 118 of the stop arm. As housing 32 continues to rotate clockwise, stop arm 106 likewise continues to pivot in the clockwise direction relative to the housing. When the housing has pivoted to a position of about 85° from horizontal, as seen in FIG. 7, surface 118 of stop arm 106 is generally parallel to the planar support surface for the billet defined by the uppermost edges of rollers 46, and the leading end of the billet abuts against surface 116 of the stop arm. Deflector plate 104 engages the billet to retain the billet against rollers 46, and it will be noted that the leading end of the billet has been lowered below the horizontal plane of the pivot axes of pins 68 and 70. Such lowering results both from the spacing of discharge end 44 of the housing from the latter pin axes and the pivotal movement of arm 106 allowing the billet to slide outwardly of discharge end 44.

At the location of the turning device components illustrated in FIG. 7, housing 32 is approaching the vertical disposition thereof, but the billet is restrained from free fall at this time. During the subsequent 5° of rotation of housing 32 from the position illustrated in FIG. 7 to the position illustrated in FIG. 8, stop arm 106 is further pivoted relative to housing 32 to displace nose 114 from beneath the leading end of billet B, whereby the latter is released for free fall into the underlying billet receiving bucket 22. It will be appreciated, therefore, that the free fall distance is minimized and that the billet is restrained from free fall until it is in the substantially vertical disposition.

During pivotal movement of housing 32 from the position illustrated in FIG. 2 to the position illustrated in FIG. 8, plate 172 moves upwardly relative to the path of billets B on conveyor 16 and, as illustrated in FIGS. 6–8, assumes a position to block movement of billets B along conveyor 16 in the direction toward the input end of the housing. As mentioned hereinabove, conveyor 16 is a driven conveyor, and it will be appreciated that the conveyor drive is stopped during turning movement of a billet positioned in the turning device. Plate 172 advantageously prevents movement of the next billet in line on the conveyor toward the entrance end of the turning device in the event of actuation of the conveyor or some other event resulting in displacement of billets B on the conveyor in the direction of conveyance during operation of the turning device.

Upon release of a billet B from the turning device, piston and cylinder mechanism 148 is actuated to pivot housing 32 counterclockwise thus to return the components of the turning device to the positions thereof illustrated in FIG. 2. At this time, the entrance end of housing 32 is open to receive the next billet in line on conveyor 16, and the turning device is ready for a subsequent turning operation.

It will be appreciated that the dimensions of the various components of the turning device will vary depending on the size of a billet to be handled, and that a wide variety of linkage arrangements can be devised for achieving pivotal movement of the stop member and the desired billet displacement relative to the housing during pivotal movement of the latter and prior to release of the billet as described above. The embodiment herein illustrated and described is capable of handling a 50 pound metal billet which is generally square in cross section and having width and height dimensions of about 4 inches and a length dimension of about 8 inches when disposed in the housing as shown in FIG. 2. In the embodiment disclosed, housing 32 has a horizontal length of about 10¾ inches and is defined by square tubing having an outside dimension of about ten inches and a wall thickness of about ½ inch. Guide assembly 92 has a wall thickness of about ½ inch, and the outer surfaces of the sidewalls thereof are laterally spaced apart about 6 inches, and the guide assembly is laterally centered with respect to housing 32. Further, the inner surface of top wall 94 of the guide is slightly spaced above the billet and the lower edges of the sidewalls of the guide are slightly spaced above the horizontal reference plane. Rollers 46 are about 1¾ inch in diameter and the axes thereof are vertically spaced about two inches from the outer surface of bottom wall 36 of the housing.

Figure 9:
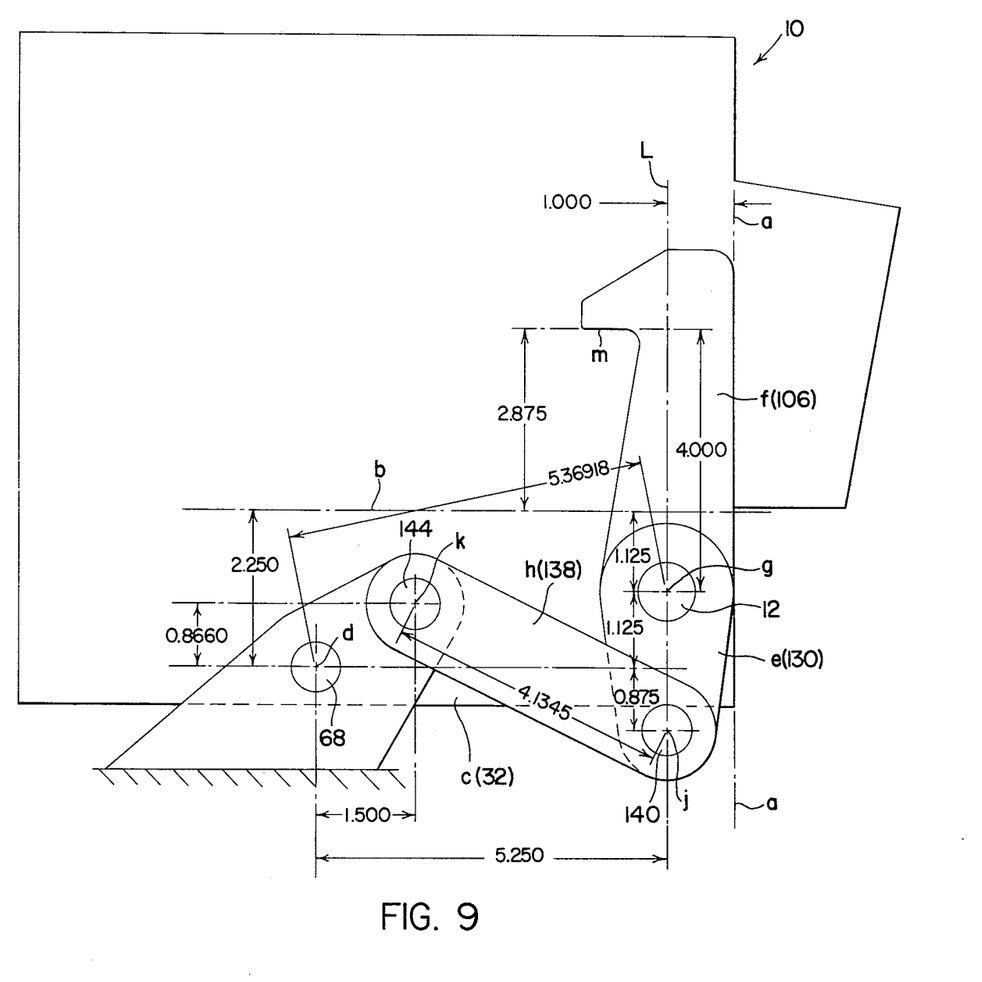

The dimensions of the links for pivoting the stop member in response to pivotal movement of the housing, and the dimensional relationships between the various components and pivot axes for the embodiment herein disclosed is schematically illustrated in FIG. 9 of the drawing. Referring to the latter FIGURE, the letter $a$ represents a vertical reference plane for measurements, and the letter $b$ represents a horizontal reference plane tangent to the upper surfaces of rollers 46. The letter $c$ represents housing 32 which is mounted for pivotal movement relative to a fixed frame component about an axis $d$ which corresponds to the axes of pivot pins 68 and 70. Link e corresponds to link 130, and member f corresponds to stop member 106. Members e and f are pivotal together relative to housing c about an axis g which corresponds to the axis of shaft 12 in FIG. 2. Link h corresponds to link 138 in FIG. 2 and has its opposite ends pivotally interconnected one with link e at axis j and the other with the frame structure at axis k. Axes j and k correspond, respectively, with the axes of pivot pins 140 and 144. Finally, line L represents a vertical line through axes g and j and parallel to vertical reference plane a, and m corresponds to nose surface 116 of stop member 106.

The several link elements illustrated in FIG. 9 are in the positions of the corresponding components as shown in FIG. 2. With respect to the specific example being described, the desired displacement of the billet relative to the housing during pivotal movement of the latter in the manner described hereinabove is achieved by providing the following dimensions with respect to the components as illustrated in FIG. 9. Horizontal distances are measured between vertical lines through the reference points, vertical distances are measured between horizontal lines through the reference points, and straight line distances are measured along straight lines between the reference points.

| | |
|---|---|
| Horizontal distance a-L | = 1.000 inch |
| Horizontal distance d-L | = 5.250 inches |
| Horizontal distance d-k | = 1.500 inches |
| Vertical dimension d-j | = 0.875 inch |
| Vertical dimension d-g | = 1.125 inches |
| Vertical dimension g-b | = 1.125 inches |
| Vertical dimension b-m | = 2.875 inches |
| Vertical dimension d-k | = 0.8660 inch |
| Link h, distance j-k | = 4.1345 inches |
| Link c, distance d-g | = 5.36918 inches |
| Vertical dimension d-b | = 2.250 inches |
| Vertical distance g-m | = 4.000 inches |

While the foregoing dimensions provide preferred motion characteristics in connection with the billet turning device herein described and illustrated, it will be appreciated that the dimensions will vary in accordance with the size of the billet to be handled, the extent of displacement of the billet forwardly of the housing prior to release thereof, and the point during pivotal movement of the housing at which the billet is released for free fall. Accordingly, it will be appreciated that the specific dimensions are given by way of example only. Moreover, it will be appreciated that link arrangements other than the specific arrangements disclosed can be advised to achieve the desired motion characteristics. Moreover, while considerable emphasis has been placed on the structure and structural interrelationship of the components of the preferred embodiment, many modifications will be readily apparent to those skilled in the art and can be made without departing from the principles of the present invention. Since many embodiments of the invention can be made and since many changes can be made in the embodiment herein illustrated and described, it is to be distinctly understood that the foregoing descriptive matter is to be interpreted merely as illustrative of the present invention and not as a limitation.

What is claimed is:

1. A device for turning an article from a generally horizontal disposition to a generally vertical disposition comprising, frame means, article support means having opposite ends and mounted on said frame means for pivotal movement about a horizontal axis transverse to the direction between said ends and between first and second positions in which an article on said support means is respectively in said horizontal and vertical dispositions, one of said opposite ends being a discharge end and being disposed below the other end when said support means is in said second position, article stop means pivotally mounted on said support means at said discharge end and engaging and supporting said article during movement of said support means from said first toward said second position, means to pivot said support means about said horizontal axis from said first position toward said second position, and means to pivot said stop means to release said article from said support means as said support means approaches said second position.

2. A device for turning an article from a generally horizontal disposition to a generally vertical disposition comprising, frame means, article support means having opposite ends and mounted on said frame means for pivotal movement about a horizontal axis transverse to the direction between said ends and between first and second positions in which an article on said support means is respectively in said horizontal and vertical dispositions, one of said opposite ends being a discharge end and being disposed below the other end when said support means is in said second position, article stop means movably mounted on said support means at said discharge end and engaging and supporting said article during movement of said support means from said first toward said second position, means to pivot said support means about said horizontal axis from said first position toward said second position, and means to move said stop means to release said article from said support means as said support means approaches said second position, said stop means being lever means pivotally mounted on said support means, and said means to move said stop means including link means pivotally interconnecting said lever means and frame means for said lever means to pivot in response to pivotal movement of said support means relative to said frame means.

3. The device according to claim 2, wherein said horizontal axis is between said opposite ends, said lever means is pivotal about a lever axis parallel to and spaced from said horizontal axis in the direction toward said discharge end, and said link means includes a link member having opposite ends pivotally connected one to said lever means at a point spaced from said lever axis and the other to said frame means.

4. The device according to claim 3, wherein said support means includes surface means supporting said article and said lever means includes a leg extending upwardly from said surface means when said support means is in said first position, said leg having a side facing said article and a projection extending from said side toward said article, said leg pivoting about said lever axis during movement of said support means from said first toward said second position to progressively move said projection outwardly of said discharge end and toward the plane of said surface means, said projection in said releasing position of said stop means being below said plane with respect to said article on said surface means.

5. The device according to claim 1, wherein said support means includes a plurality of roller members rotatable about axes parallel to said horizontal axis to support movement of said article relative to said support means.

6. The device according to claim 1, and means on said support means for guiding movement of said article in the direction between said ends.

7. The device according to claim 6, wherein said support means includes support surface means for said article and said guide means includes deflector means spaced from said surface means and extending outwardly from said discharge end of said support means, said deflector means engaging said article during movement of said support means toward said second position to maintain said article in engagement with said surface means.

8. The device according to claim 1, wherein said other end of said support means is an article receiving end adapted to receive articles moving along a horizontal feed path in the direction from said receiving end toward said discharge end, and means at said article receiving end of said support means to block movement of an article along said path during movement of said support means between said first and second positions.

9. The device according to claim 8, wherein said means to block article movement includes a member mounted on said support means at said receiving end for movement therewith.

10. A device for turning an article from a horizontal disposition to a vertical disposition comprising, frame means, table means having article receiving and discharge ends and means providing article supporting surface means between said ends, said table means being interconnected with said frame means for pivotal movement about an axis transverse to the direction between said ends and between a first position in which said surface means is horizontal and a second position in which said surface means is vertical and said discharge end is below said receiving end, stop arm means mounted on said table means at said discharge end for pivotal movement about an arm axis parallel to said transverse axis, said arm means extending above said surface means to engage an article thereon when said table means is in said first position and being positioned below said surface means when said table means is in said second position, means to pivot said table means about said transverse axis from said first position toward said second position, and link means pivotally interconnecting said arm means and frame means for pivoting said arm means relative to said table means in response to pivotal movement of said table means.

11. The device according to claim 10, wherein said arm axis is adjacent said discharge end and said transverse axis is spaced from said arm axis toward said receving end, said arm and transverse axes being below said surface means, and said link means including a link member having opposite ends pivotally interconnected one with said arm means on an axis parallel to and spaced from said arm axis and the other with said frame means on an axis parallel to and spaced from said transverse axis.

12. The device according to claim 11, wherein said means for pivoting said table means includes piston and cylinder means including cylinder means pivotally connected to said frame means and piston means having a piston rod reciprocable relative to said cylinder means, said piston rod having an outer end pivotally connected to said table means on an axis adjacent said discharge end and below said transverse axis.

13. The device according to claim 10, wherein said table means includes a housing member having a bottom wall and sidewalls extending upwardly therefrom, said means providing article supporting surface means including a plurality of rollers between said sidewalls and supported thereby for rotation about axes parallel to said transverse axis.

14. The device according to claim 13, and plate means extending downwardly from said bottom wall adjacent said receiving end of said table means, said plate means having an arcuate edge facing outwardly of said receiving end, said supporting surface means providing a reference plane when horizontal, said arcuate edge of said plate means being below said plane when said supporting surface means is horizontal and extending above said plane during movement of said table means between said first and second positions.

15. The device according to claim 13, wherein said housing member further includes a top wall between said sidewalls and spaced above said bottom wall, and means supported by said top wall for positioning and guiding an article on said rollers.

16. The device according to claim 15, wherein said positioning and guiding means is an inverted U-shaped member having a web parallel to said top wall and flanges parallel to said sidewalls, said sidewalls and top wall having ends defining said discharge end of said table means, and said web including a portion inclining outwardly and downwardly beyond said ends of said sidewalls and top wall.

17. The device according to claim 16, wherein said stop arm means is positioned between said sidewalls and pivotally mounted thereon, said arm means having on end adjacent said web when said table means is in said first position, a nose on said end of said arm means and extending toward said receiving end of said table means, said arm means having a second end, said arm axis being between said arm ends and adjacent said discharge end of said table means, said transverse axis being spaced from said arm axis toward said receiving end, and said link means including a link member having opposite ends pivotally connected one to said second arm end and the other to said frame means on an axis parallel to and between said arm axis and said transverse axis.

18. The device according to claim 17, and plate means extending downwardly from said bottom wall adjacent said receiving end of said table means, said plate means having an arcuate edge facing outwardly of said receiving end, said supporting surface means providing a reference plane when horizontal, said arcuate edge of said plate means being below said plane when said supporting surface means is horizontal and extending above said plane during movement of said table means between said first and second positions.

19. The device according to claim 18, wherein said means for pivoting said table means includes piston and cylinder means including cylinder means pivotally connected to said frame means and piston means having a piston rod reciprocable relative to said cylinder means, said piston rod having an outer end pivotally connected to said table means on an axis adjacent said discharge end and below said transverse axis.

* * * * *